United States Patent Office 3,314,645
Patented Apr. 18, 1967

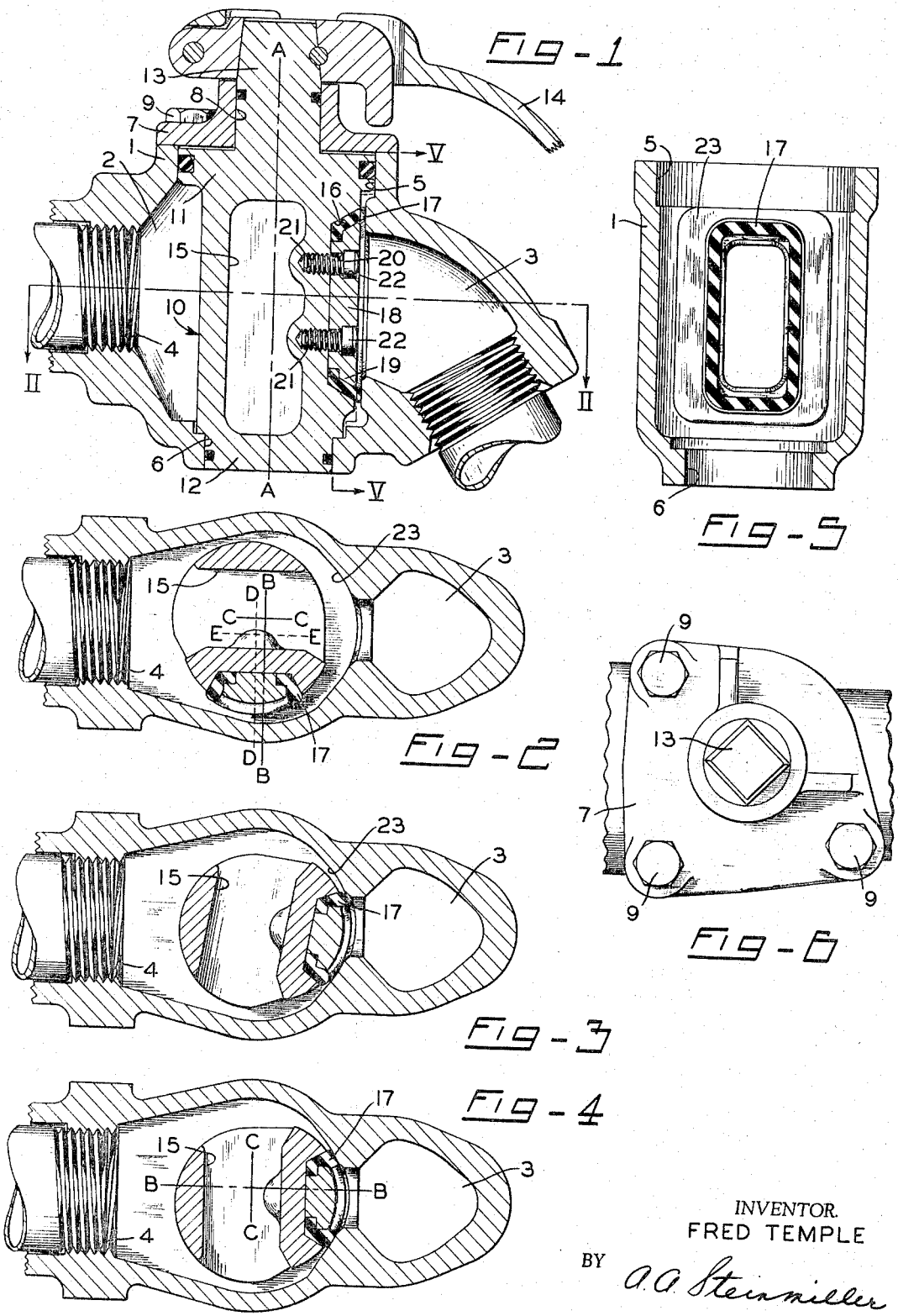

3,314,645
ANGLE COCK
Fred Temple, Pittsburgh, Pa., assignor to Westinghouse Air Brake Company, Wilmerding, Pa., a corporation of Pennsylvania
Filed Oct. 23, 1963, Ser. No. 318,228
1 Claim. (Cl. 251—317)

This invention relates to angle cocks of the type usually employed in the brake pipe of fluid pressure braking systems on railroad cars and trains, and, more particularly, to an improved and simpler form of angle cock which is less costly to make, easier to service, and of longer service life than angle cocks heretofore known.

Commercially available angle cocks, used in the brake pipe of fluid pressure braking systems on railway cars, usually comprise a tapered cock key with a transverse passageway and rotatably journaled in a cock body or casing so as to open and close communication through the angle cock and thus control communication between brake pipe sections on adjacent cars. In presently available angle cocks there is metal-to-metal contact between the cock key and the bore of the cock body which requires precision machining and lapping to minimize leakage between the parts. The manufacturing of such metal-to-metal fitting parts requires strict adherence to tolerances which adds considerably to the cost of manufacture.

It is an object of this invention to provide a new and improved angle cock construction employing a resilient type of sealing means which is economical to manufacture and minimizes wear, while providing a positive long-service-life seal in a certain rotative position of the angle cock. In addition, such improved angle cock facilitates repair and inspection in the field, requiring a minimum of skill.

Accordingly, the improved angle cock comprises a casing having a chamber with a pair of fluid passageways or ports extending through such casing and communicating with such chamber. The wall portion of the casing within the chamber adjacent one of the passageways defines a valve seat with which a movable cock key cooperates to control the passage of fluid through such chamber into such one passageway. The cock key has a replaceable gasket which receives a minimum amount of wear due to the pivotal action of the cock key which swings the gasket into frictional engagement with the valve seat only during the sealing off of pressurized flow and maintains the gasket out of contact with the valve seat and adjacent surfaces during the open positions of the angle cock.

Other objects and advantages of the invention become more apparent in the following more detailed description of the invention.

FIG. 1 is a vertical sectional view of an angle cock illustrating the cock key in its closed position.

FIG. 2 is a sectional view of the angle cock taken along line II—II of FIG. 1, with the cock key rotated clockwise to an open position.

FIG. 3 is a sectional view of the angle cock taken along line II—II of FIG. 1, with the cock key rotated from its closed position to a position in which it is about to contact the valve seat immediately prior to reaching its closed position.

FIG. 4 is a sectional view of the angle cock taken along line II—II of FIG. 1 illustrating the cock key in its closed position.

FIG. 5 is a sectional view, taken along line V—V of FIG. 1, showing a face view of the valve seat with the sealing gasket in sealing position thereon.

FIG. 6 is a plan view of the angle cock shown in FIG. 1.

Referring to the drawings, and more particularly to FIG. 1, the angle cock comprises a casing 1 having a chamber 2 that communicates with a pair of diametrically opposed passageways 3 and 4. The passageway 4, as shown in FIG. 1, is connectible to the brake pipe, a fragmentary unnumbered portion only being shown, while passageway 3 is connectible to a hose, only a portion of which is shown. Casing 1 has an upper opening 5 and a lower opening 6 which communicate with the chamber 2.

A cap 7 having a centrally disposed bore 8 is secured to the upper end portion of casing 1 as by cap screws 9 such that the central axis of bore 8 coincides with the common axis of openings 5 and 6. Secured for rotation within chamber 2 is a cock key 10 having an upper flange 11 and a lower portion 12 of reduced diameter rotatably journaled in openings 5 and 6, respectively. Extending upwardly from the upper flange 11 of cock key 10 is a stem portion 13 which is journaled for rotation in bore 8 of cap 7. The flange 11 and lower portion 12 as well as stem 13 are provided with circumferential annular grooves to receive O-ring sealing gaskets to prevent the escape of pressurized fluid from chamber 2. The upwardly extending end of stem portion 13 is adapted to have suitably connected thereto an operating handle 14 to facilitate the rotation of the cock key 10 relative to the stationary casing 1. Removal of the handle and the cap 7 permits the removal of the cock key 10 from the casing 1 through opening 5. The intermediate portion of the cock key 10 has an elongated bore 15 extending transversely therethrough for connecting passageways 3 and 4 in a certain position of rotation of cock key 10. As shown in FIG. 1, the axis of rotation of cock key 10 is along line AA, which is normal to the intersection of lines BB and CC in FIG. 2.

The intermediate body portion of cock key 10 is recessed as at 16 to accommodate a generally oblong-shaped gasket 17 and a retainer 18. Retainer 18 has a flanged edge portion 19 and a pair of bores 20, which bores 20 are adapted to be aligned with threaded bores 21 in the cock key 10. With the gasket 17 located within recess 16, and with the flanged edge portion 19 abuttingly engaging gasket 17, bores 20 are aligned with the bores 21 such that cap screws 22 are received by bores 20. The cap screws 22 are threaded into bores 21 to rigidly secure the gasket 17 onto cock key 10. As shown in FIG. 1, the forward portion of gasket 17 protrudes forwardly of the cock key 10 out of the recessed portion to provide a sealing bead for engagement with the valve seat to be described.

The curved sealing face of the gasket 17, as viewed in FIGS. 2 through 4 inclusive, describes an arc whose center coincides with the intersection of lines DD and EE. As the cock key 10 is rotated on its AA axis, gasket 17 remains out of contact with the walls of chamber 2 until the cock key 10 is rotated beyond the position shown in FIG. 3, which is approximately 80° of rotation from the fully open position shown in FIG. 2. Such action is accomplished through the offset relation of the axis of the center of curvature of the gasket face to the center of rotation of cock key 10, thereby minimizing wear on the gasket 17. As the cock key 10 is rotated further in a counterclockwise direction to the position shown in FIG. 4, the gasket 17 is compressed and seals off passageway 3 from chamber 2.

In the operation of the angle cock, the cock key 10 in the fully open position, as shown in FIG. 2, has the through bore 15 aligned with passageways 3 and 4 whereby pressurized fluid flows at an unrestricted rate therethrough. Rotation of cock key 10 about its axis of rotation normal to the intersection of lines BB and CC for approximately 80° brings gasket 17 almost into sealing contact with the sealing face 23 of chamber 2, which sealing face 23 is adjacent passageway 3. Continued rotation of the cock key 10 forces gasket 17 into sealing and abutting engagement with the sealing face 23 to thereby effectively close off communication between chamber 2 and passageway 3.

In repairing the angle cock 1, after removing the handle 14, the cap screws 9 are removed and the cock key 10 is removed from the cylindrical chamber 2 by lifting upwardly on the stem 13. Gasket 17 is removed and replaced with a new gasket 17 by the removal of cap screws 22 and the separation of the retainer 18 from the cock key 10. After replacing gasket 17, cock key 10 is returned into the chamber 2 such that the lower end portion thereof frictionally engages bore 6 and the upper portion thereof engages opening 5, after which cap screws 9 secure the cap 7 to the casing 1.

It will be apparent, therefore, that replacement of the gasket 17 does not require removal of the cock key from the brake pipe. Moreover, the replacement of the gasket may be readily performed by relatively unskilled labor in a few minutes time. The angle cock is thus capable of a heretofore unattained service life for this type of service.

Having now described the invention, what I claim as new and desire to secure by Letters Patent, is:

An angle cock comprising:
(a) a casing having a chamber,
(b) said casing having upper and lower aligned bores communicating with said chamber,
(c) a valve body having upper and lower end portions journaled in said upper and lower bores respectively, and for rotation about a common axis,
(d) means operatively connected to one of said end portions for rotating said valve body in said chamber,
(e) a replaceable cover member secured to said casing adjacent said upper bore for retaining said valve body in said chamber,
(f) said valve body having a shallow recess with conical walls flared outwardly toward the outer surface of the valve body,
(g) a shallow cup-shaped gasket having conical walls conforming to the said recess and a base portion which rests on the bottom of the recess, the depth of the gasket being greater than the depth of the recess so that the outer rim of the conical walls of the gasket projects beyond the outer face of the valve body, said gasket having a central opening therein,
(h) a retaining disc having a conical periphery and being of shallower depth than the depth of the gasket and extending through the opening in the gasket and secured in metal-to-metal contact to the bottom of the recess, and having a shoulder clamping the base portion of the gasket to the bottom of the recess and at the same time the conical periphery firmly presses the walls of the gasket to the walls of the recess,
(i) said casing having a pair of spaced passageways communicating with said chamber,
(j) said valve body having a through bore adapted to interconnect the said passageways,
(k) said chamber having a valve seat on the wall portion thereof adjacent to and surrounding one of said passageways, and being substantially larger than the valve body to prevent contact of the valve body therewith,
(l) said valve body having a first rotary position in which the said through bore is aligned with said passageways and in which the valve body and outer rim of the gasket are completely out of contact with the walls of the chamber, and having a second rotary position in which only the outer rim of the gasket seats on the valve seat to close off communication through said passageways.

References Cited by the Examiner
UNITED STATES PATENTS

| | | | |
|---|---|---|---|
| 1,028,134 | 6/1912 | Raymaker | 251—301 |
| 2,803,426 | 8/1957 | De Zurik | 251—301 |
| 2,945,669 | 7/1960 | Gallagher | 251—309 |
| 3,035,811 | 5/1962 | Hamer | 251—317 |
| 3,133,723 | 5/1964 | Goldman et al. | 251—309 |

M. CARY NELSON, *Primary Examiner.*

E. FEIN, *Assistant Examiner.*